Feb. 6, 1934.  J. WYND  1,946,377

FITTING FORM FOR GLASS PLATES

Filed Oct. 10, 1931   2 Sheets-Sheet 1

INVENTOR
John Wynd
by
Bradley & Bell attys.

Feb. 6, 1934.  J. WYND  1,946,377
FITTING FORM FOR GLASS PLATES
Filed Oct. 10, 1931  2 Sheets-Sheet 2
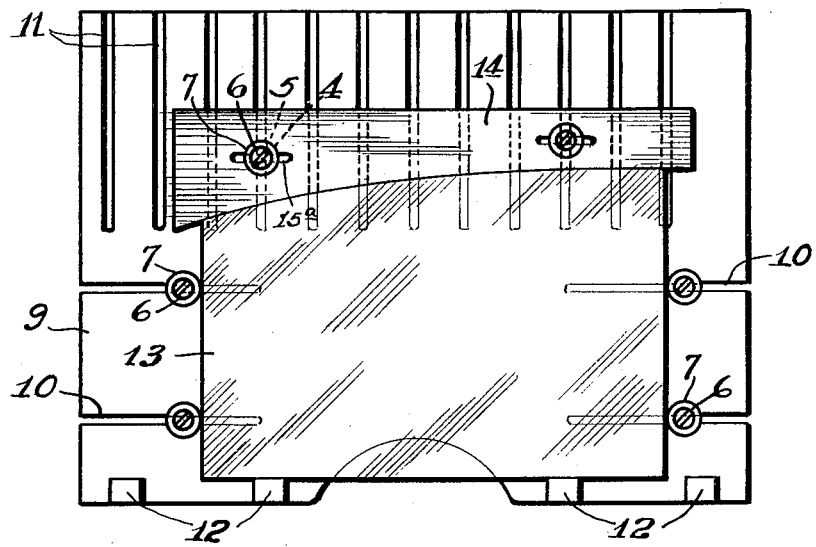
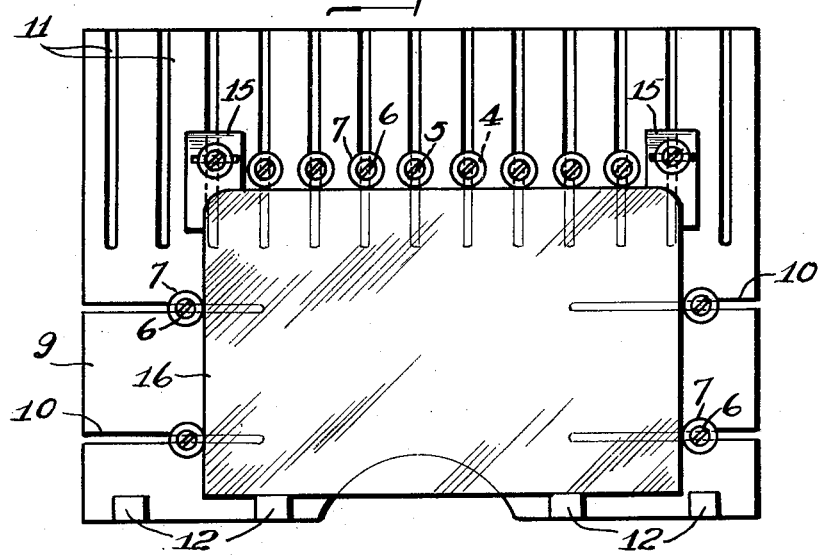
INVENTOR
John Wynd
Bradley & Bee attys Patented Feb. 6, 1934

1,946,377

UNITED STATES PATENT OFFICE 1,946,377

FITTING FORM FOR GLASS PLATES

John Wynd, Tarentum, Pa., assignor to Duplate Corporation, a corporation of Delaware Application October 10, 1931. Serial No. 568,161

7 Claims. (Cl. 33—175)

Figure 1:
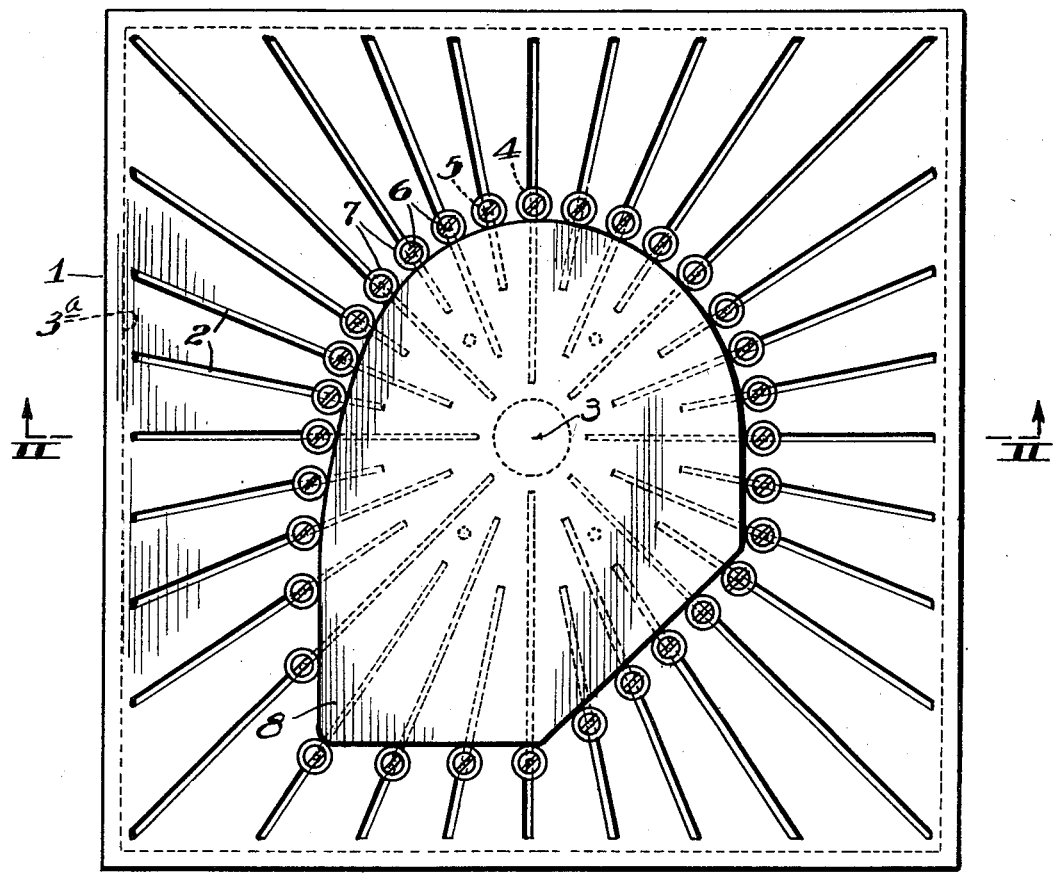
Figure 2:
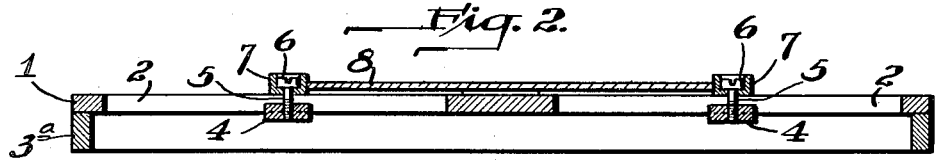
Figure 3:
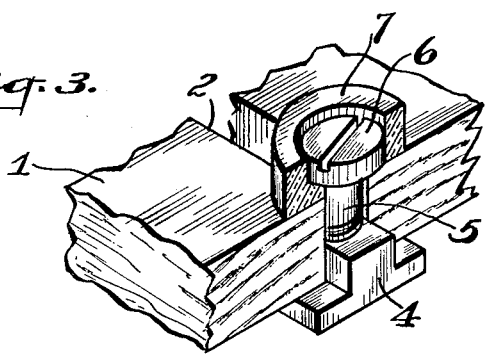

The invention relates to a fitting form for use in connection with glass plates. The plates with which the form is particularly designed for use are of laminated or safety glass for use in automobiles, but may also be used to advantage in checking up plates of ordinary plate glass for use in automobiles. Glass plates for the purpose indicated, must be made accurately to specification, and in order to check the plates after their edges have been cut and finished to the desired contour, it is the practice to place them successively in a wood template or form having a recess of the exact size and shape required. If the plates fit into the recess with a certain degree of accuracy, they are approved. Otherwise they are subject to rejection. As the trade requires glass plates of a wide variety of shapes and contours, the cost of the forms involves a large item of expense, as well as the storage of such forms, and it is the object of the present invention to reduce this expense by providing forms each of which can be used for checking plates of a wide variety of sizes and contours. Certain embodiments of the invention are illustrated in the accompanying drawings, wherein:

Figure 1 is a plan view of one form of apparatus. Fig. 2 is a section on the line II—II of Fig. 1. Fig. 3 is a perspective detail view. Fig. 4 is a plan view of a modified form of construction. And Fig. 5 is a plan view of still another form of construction.

Referring to Figs. 1 and 2, 1 is a plate or board preferably of wood, provided with a plurality of radial slots 2, extending from the edges of the plate inwardly toward a common center 3. The plate is supported and stiffened by means of strips 3ª (Fig. 2) extending around the edges of the plate. Mounted in each of the slots 2, is a block 4, T shape in cross section, into which is fitted a screw 5, having a slotted head 6, lying above the level of the plate 1. Carried by the screw is a ring or disk 7, preferably of fiber, and also lying above the surface of the plate. The base of the block 4 underlies the lower face of the plate 1 so that when the screw 5 is screwed down tight, the base of the block 4 and the ring 5 constitute clamping members which securely grip the board or plate between them and so hold the block in an adjusted position.

In order to set the device for checking up plates of a certain size, a template 8 (Fig. 1) ordinarily of aluminum, is employed, such plate being cut to the exact size and contour of the glass plates which are to be checked up. This template is placed upon the plate 1 as indicated in Fig. 1 and the stop members comprising the block 4 and the parts carried thereby are pushed up against the edges of the plate 8 and locked in position. The template 8 is then removed and the device is ready for use. In use, the plates of glass, either ordinary plate glass or laminated glass, are successively placed inside the set of disks, or stop members 7 to see whether or not the plate will fit inside the disks with the necessary degree of accuracy. It will be apparent that the device as above illustrated and described can be set to act as a checking means for plates of a wide variety of sizes and contours.

Fig. 4 illustrates a modification wherein the base plate 9 is provided with slots 10 and 11 which extend inwardly from the edges of the plate, but are not arranged radially. The plate is also provided along one edge with fixed stops 12 adapted to be engaged by one edge of the plates 13, which are to be checked. The stop members in this case are the same as in the instruction of Figs. 1, 2 and 3 comprising blocks mounted in the slots and carrying screws and disks 7 like those heretofore described. In this construction a contour plate 14 is employed held by two of the disks 7, such plate being slotted, as indicated in 15ª, in order to provide adjustment transversely of the slots 11. This plate has its inner edge curved to the exact contour desired. In using the device the stop members 7 and the plate 14 are positioned as before by means of a template and after the parts are clamped in position the glass plates may be checked in the recess thus formed, as in the other type of construction.

Fig. 5 illustrates still another form of construction particularly adapted for checking plates of a different shape. In this construction the contour plate 14 of Fig. 4 is replaced by a pair of plates 15—15 ordinarily referred to as radius blocks which have their inner edges curved to the exact contour of the corners of the plates 16 to be checked. In other particulars this construction follows that of Fig. 4, similar parts being similarly numbered. It will be apparent that still other forms of the invention may be employed, depending upon the character of the plates to be checked.

What I claim is:

1. In combination, in a fitting form for glass sheets, a base plate provided with slots extending inwardly from the edges of the plate, blocks T shape in cross section mounted for sliding adjustment in the slots with the base portions thereof below the lower face of the plate, and stop members including screws threaded into the blocks with their shanks lying in said grooves and with their heads lying above the top of the plate.

2. In combination, in a fitting form for glass sheets, a base plate provided with slots extending inwardly from the edges of the plate, blocks T shape in cross section mounted for sliding adjustment in the slots with the base portions thereof below the lower face of the plate, screws threaded into the blocks with their shanks lying in said slots and provided with heads, and discs mounted on the screws above the plate and adapted to be clamped in position by the screws.

3. In combination, in a fitting form for glass sheets, a base plate provided with slots extending radially from points adjacent the edges of the plate inwardly toward a common center, blocks mounted for sliding adjustment along the slots and provided with stop members projecting above the upper face of the plate, and means for securing the blocks and their stop members in adjusted position, said means including screws for causing the blocks and stops to approach each other and grip the plate at the sides of the slots.

4. In combination, in a fitting form for glass sheets, a base plate provided with slots extending inwardly from the edges of the plate, blocks mounted for sliding adjustment along the slots and provided with stop members projecting above the upper face of the plate, and means for clamping the blocks and their stop members in adjusted position, one of said stop members comprising a contour plate having its sheet contacting edge curved.

5. In combination, in a fitting form for glass sheets, a base plate provided with slots extending inwardly from the edges of the plate, blocks mounted for sliding adjustment along the slots and provided with stop members projecting above the upper face of the plate, and means for clamping the blocks and their stop members in adjusted position, one of said stop members comprising a contour plate having its sheet contacting edge curved and adjustable transversely of the slots over which it lies.

6. In combination, in a fitting form for glass sheets, a base plate provided with slots extending inwardly from the edges of the plate, blocks mounted for sliding adjustment along the slots and provided with stop members projecting above the upper face of the plate, fixed stop means adjacent one side of the plate, and means for clamping the blocks and their stop members in adjusted position.

7. In combination, in a fitting form for glass sheets, a base plate provided with slots extending inwardly from the edges of the plate, blocks mounted for sliding adjustment along the slots and provided with stop members projecting above the upper face of the plate, and means for clamping the blocks and their stop members in adjusted position, two of said stop members comprising contour plates for the corners of the glass sheets having their sheet contacting edges curved.

JOHN WYND.